United States Patent
Asanuma et al.

(10) Patent No.: US 9,309,416 B2
(45) Date of Patent: Apr. 12, 2016

(54) PROCESS FOR PRODUCING ORGANIC THIN FILM LAMINATE USING SOLID OR OILY MATERIAL FOR ORGANIC THIN FILM FORMATION APPLICATIONS

(75) Inventors: Daisuke Asanuma, Ichihara (JP); Tomoya Hidaka, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 301 days.

(21) Appl. No.: 13/881,762

(22) PCT Filed: Nov. 7, 2011

(86) PCT No.: PCT/JP2011/075567
§ 371 (c)(1),
(2), (4) Date: Apr. 26, 2013

(87) PCT Pub. No.: WO2012/063767
PCT Pub. Date: May 18, 2012

(65) Prior Publication Data
US 2013/0220176 A1     Aug. 29, 2013

(30) Foreign Application Priority Data
Nov. 11, 2010 (JP) .................................. 2010-252451

(51) Int. Cl.
C09D 7/14      (2006.01)
C08G 77/34     (2006.01)
C09D 183/04    (2006.01)
C08G 77/04     (2006.01)
C08G 77/08     (2006.01)

(52) U.S. Cl.
CPC ............... C09D 7/14 (2013.01); C08G 77/045 (2013.01); C08G 77/08 (2013.01); C08G 77/34 (2013.01); C09D 183/04 (2013.01)

(58) Field of Classification Search
CPC ...... C09D 7/14; C09D 183/04; C08G 77/045; C08G 77/08; C08G 77/34
See application file for complete search history.

(56) References Cited

U.S. PATENT DOCUMENTS

| | | |
|---|---|---|
| 5,981,056 A | 11/1999 | Ogawa et al. |
| 6,133,466 A | 10/2000 | Edelmann et al. |
| 2003/0166817 A1 | 9/2003 | Barfurth et al. |
| 2010/0324210 A1 | 12/2010 | Hidaka et al. |

FOREIGN PATENT DOCUMENTS

| | | |
|---|---|---|
| CN | 1432589 A | 7/2003 |
| EP | 0 492 545 A2 | 7/1992 |
| JP | A-4-132637 | 5/1992 |
| JP | A-4-221630 | 8/1992 |
| JP | A-4-367721 | 12/1992 |
| JP | 06-136124 * | 5/1994 |
| JP | A-6-136124 | 5/1994 |
| JP | A-8-337654 | 12/1996 |
| JP | A-11-228942 | 8/1999 |
| JP | A-11-322368 | 11/1999 |
| WO | WO 01/12737 A1 | 2/2001 |
| WO | WO 2009/104424 A1 | 8/2009 |

OTHER PUBLICATIONS

Apr. 4, 2014 European Search Report issued in European Application No. 11 83 9917.
Dec. 4, 2013 Chinese Office Action issued in Chinese Application No. 201180052757.X (with partial translation).
Kojio et al., "Novel Method to Prepare Organosilane Monolayers on Solid Substrate," *Bull. Chem. Soc. Jpn.*, vol. 74, pp. 1397-1401, 2001.
Shimojima et al., "Inorganic-Organic Layered Materials Derived via the Hydrolysis and Polycondensation of Trialkoxy(alkyl)silanes," *Bull. Chem. Soc. Jpn.*, vol. 70, pp. 2847-2853, 1997.
Feb. 7, 2012 International Search Report issued in International Patent Application No. PCT/JP2011/075567 (with translation).

* cited by examiner

*Primary Examiner* — David M Brunsman
(74) *Attorney, Agent, or Firm* — Oliff PLC

(57) ABSTRACT

A solid material or an oily material for forming an organic thin film is produced by hydrolyzing and condensing at least one kind of organic metal compound expressed by Formula (1) in a lower alcohol-based solvent in the presence of water and an acid with a concentration of 0.5% to 5% by mass, or in a solvent that contains at least an aliphatic ether based or aliphatic ketone based solvent and an acid content of 0.1 to 20 moles acid per mole of the organic metal compound, in the resultant reaction solution. The solid material or oily material that is obtained is dissolved in an organic solvent, and a substrate is brought into contact with a solution that is obtained to form a highly functional organic thin film on the substrate.

[Chemical Formula 1]

$$R^1_n MX_{m-n} \qquad (I)$$

9 Claims, No Drawings

US 9,309,416 B2

PROCESS FOR PRODUCING ORGANIC THIN FILM LAMINATE USING SOLID OR OILY MATERIAL FOR ORGANIC THIN FILM FORMATION APPLICATIONS

TECHNICAL FIELD

The present invention relates to a method for producing a solid material or an oily material that is used to form an organic thin film laminate, and a method for producing the organic thin film laminate using the solid material or oily material.

This application is a 371 filing of PCT/JP2011/075567, filed Nov. 7, 2011.

Priority is claimed on Japanese Patent Application No. 2010-252451, filed Nov. 11, 2010, the content of which is incorporated herein by reference.

BACKGROUND ART

A surface of a substrate formed from glass, metal, plastic, ceramics, or the like has been modified depending on a purpose in various fields in the related art. For example, a fluorine-containing silane-based coupling agent is coated on a surface of glass or plastic so as to apply water repellency or oil repellency to the surface.

An organic metal compound such as a fluorine-containing silane-based coupling agent carries out a hydrolysis-polycondensation reaction to form a film. In the invention, this film is referred to as an organic metal thin film.

As a method for forming the organic metal thin film to modify a substrate surface, for example, the following methods are known.

(1) PTL 1 to PTL 3 disclose a method for producing a chemical absorption film in which peeling resistance and transparency are high and which does not deteriorate glossiness of a substrate surface or transparency of the substrate.

(2) PTL 4 discloses a method for forming a chemical absorption film. In the method, a mixed solution, which contains at least an alkoxy silane-based surfactant, a non-aqueous solvent not containing active hydrogen, and a silanol condensation catalyst, is brought into contact with the substrate surface, and the chemical absorption film is covalently bonded through a siloxane bond.

(3) NPL 1 discloses a method for forming a crystalline monomolecular film by developing an organic solvent solution of a silane-based surfactant on a silicon wafer surface onto which purified water is supplied dropwise.

(4) PTL 5 and PTL 6 disclose a method for fixing a water-repellent film constituted by a monomolecular layer to a substrate surface through a silanol group using a monomer or a polymer of a hydrolysate of a fluoroalkyl group-containing silane compound that is hydrolyzed under an acid catalyst.

(5) PTL 7 discloses a method for producing a condensation product by hydrolyzing and condensing an organic metal compound using an acid catalyst and a specific polar solvent. The condensation product has an OH group, and the hydrolysable group derived from the organic metal compound is appropriately present without being completely decomposed, and thus the condensation product contains a condensation product with a low degree of condensation.

In addition, NPL 2 discloses a technology of obtaining white powder by hydrolyzing and condensing triethoxy alkyl silane. However, NPL 2 does not disclose that the white powder is dissolved in an organic solvent and the resultant solution is used as an organic thin film-forming solution.

CITATION LIST

Patent Literature

[PTL 1] Japanese Unexamined Patent Application, First Publication No. H4-132637
[PTL 2] Japanese Unexamined Patent Application, First Publication No. H4-221630
[PTL 3] Japanese Unexamined Patent Application, First Publication No. H4-367721
[PTL 4] Japanese Unexamined Patent Application, First Publication No. H8-337654
[PTL 5] Japanese Unexamined Patent Application, First Publication No. H11-228942
[PTL 6] Japanese Unexamined Patent Application, First Publication No. H11-322368
[PTL 7] PCT International Publication No. WO2009/104424

Non-Patent Literature

[NPL 1] Bull. Chem. Soc. Jpn., 74, 1397-1401 (2001)
[NPL 2] Bull. Chem. Soc. Jpn., 70, 2847-2853 (1997)

SUMMARY OF INVENTION

Technical Problem

However, in the above-described methods, since an organic thin film-forming solution is prepared and is preserved in a solution state, there is a problem in that a component for forming an organic thin film settles before the thin film is prepared, and the like.

The invention has been made in consideration of the above-described circumstances, and an object thereof is to provide a composition for forming an organic thin film, which may be preserved for a long period of time, and a method for producing an organic thin film-laminated plate using the composition.

Solution to Problem

The present inventors made a thorough investigation to accomplish the above-described object. As a result, they found that when a solid or oily condensation product is prepared by hydrolyzing an organic metal compound under specific conditions, the condensation product is preserved in a solid or oily state, the condensation product is dissolved in an organic solvent, and the resultant solution is used, a dense monomolecular film or organic thin film having less impurities may be quickly formed on a substrate, and they accomplished the invention.

That is, the present invention relates to the followings:

(1) A method for producing an organic thin film-laminated plate, the method including:

process (A): a process of hydrolyzing and/or condensing at least one kind of organic metal compound expressed by formula (I) in a lower alcohol-based solvent or a mixed solvent containing the lower alcohol-based solvent in the presence of water and an acid with a concentration of 0.5% to 5% by mass in the resultant reaction solution, or a process of hydrolyzing and/or condensing the organic metal compound in a solvent that contains at least one kind selected from an aliphatic ether-based solvent and an aliphatic ketone-based solvent and does not contain the lower alcohol solvent in the presence of water and an acid of 0.1 to 20 moles with respect to 1 mole of the organic metal compound expressed by Formula (I),

[Chemical Formula 1]

$$R^1{}_n MX_{m-n} \qquad (I),$$

wherein in the formula, $R^1$ represents a hydrocarbon group having 1 to 30 carbon atoms and optionally having a substituent group, or a halogenated hydrocarbon group having 1 to 30 carbon atoms and optionally having a substituent group, M represents at least one kind of metal atom selected from a group consisting of Si, Ge, Sn, Ti, and Zr, X represents the hydroxyl group or a hydrolysable group, n represents any integer of 1 to (m−1), m represents an atomic valence of M, in a case where n is 2 or more, $R^1$ is the same or different in each case, and in a case where (m−n) is 2 or more, X is the same or different in each case;

process (B): a process of separating a solid content precipitated from the reaction solution of the process (A) or an oily material separated from the reaction solution, or concentrating and drying the reaction solution of the process (A) to obtain the solid content or oily material;

process (C): a process of mixing the solid material or oily material obtained in the process (B) with at least one kind of solvent selected from the group consisting of a hydrocarbon-based solvent a fluorine-based solvent, and a silicon-based solvent, and removing insoluble matter as necessary to obtain an organic thin film-forming solution; and process (D): a process of bringing a substrate into contact with the organic thin film-forming solution that is obtained in the process (C) to produce a substrate on which an organic thin film is laminated.

(2) The method for producing an organic thin film-laminated plate according to (1), further including: a process of neutralizing the acid between the process (A) and the process (B).

(3) The method for producing an organic thin film-laminated plate according to (1) or (2), wherein in the process (A), the hydrolysis or condensation is carried out until at least the solid content precipitates or the oily content is separated.

(4) The method for producing an organic thin film-laminated plate according to any one of (1) to (3), wherein in the process (A), the hydrolysis or condensation is carried out for at least 48 hours.

(5) The method for producing an organic thin film-laminated plate according to any one of (1) to (4), wherein the organic thin film is a monomolecular film.

(6) A method for producing a solid material or an oily material for forming an organic thin film, the method including: a process of hydrolyzing and condensing at least one kind of organic metal compound expressed by Formula (I) in a lower alcohol-based solvent in the presence of water and an acid with a concentration of 0.5% to 5% by mass in the resultant reaction solution to obtain the solid material or oily material,

[Chemical Formula 2]

$$R^1{}_n MX_{m-n} \qquad (I),$$

wherein in the formula, $R^1$ represents a hydrocarbon group having 1 to 30 carbon atoms and optionally having a substituent group, or a halogenated hydrocarbon group having 1 to 30 carbon atoms and optionally having a substituent group, M represents at least one kind of metal atom selected from the group consisting of Si, Ge, Sn, Ti, and Zr, X represents a hydroxyl group or a hydrolysable group, n represents any integer of 1 to (m−1), m represents an atomic valence of M, in a case where n is 2 or more, $R^1$ is the same or different in each case, and in a case where (m−n) is 2 or more, X is the same or different in each case.

(7) A method for producing a solid material or an oily material for forming an organic thin film, the method including: a process of hydrolyzing and condensing at least one kind of organic metal compound expressed by Formula (I) in a solvent that contains at least one kind selected from an aliphatic ether-based solvent and an aliphatic ketone-based solvent in the presence of water and an acid of 0.1 to 20 moles with respect to 1 mole of the organic metal compound expressed by Formula (I) to obtain the solid material or oily material,

[Chemical Formula 3]

$$R^1{}_n MX_{m-n} \qquad (I),$$

wherein in the formula, $R^1$ represents a hydrocarbon group having 1 to 30 carbon atoms and optionally having a substituent group, or a halogenated hydrocarbon group having 1 to 30 carbon atoms and optionally having a substituent group, M represents at least one kind of metal atom selected from the group consisting of Si, Ge, Sn, Ti, and Zr, X represents a hydroxyl group or a hydrolysable group, n represents any integer of 1 to (m−1), m represents an atomic valence of M, in a case where n is 2 or more, $R^1$ is the same or different in each case, and in a case where (m−n) is 2 or more, X is the same or different in each case.

(8) An organic thin film-laminated plate that is produced by the method for producing an organic thin film-laminated plate according to any one of (1) to (5).

(9) A solid material or an oily material for forming an organic thin film that is produced by the method for producing a solid material or an oily material for forming an organic thin film according to (6) or (7).

Advantageous Effects of Invention

According to the invention, a composition for forming an organic thin film may be obtained as a solid material or an oily material that is very suitable for preservation or transportation. The solid material or oily material for forming an organic thin film of the invention may be preserved for at least one year at room temperature.

In addition, when the solid material or oily material for forming an organic thin film is dissolved in an organic solvent during formation of the organic thin film to prepare an organic thin film-forming solution, an organic thin film such as a dense monomolecular film having less impurities may be quickly formed on substrates formed from various materials,

DESCRIPTION OF EMBODIMENTS

Hereinafter, preferred examples of the invention will be described, but the invention is not limited to these examples. Addition, omission, substitution, and other modifications of configurations may be made within a range not departing from the gist of the invention.

(1) Organic Metal Compound

An organic metal compound that is used in the invention is a compound expressed by Formula (I).

[Chemical Formula 4]

$$R^1{}_n MX_{m-n} \qquad (I)$$

In the formula, $R^1$ represents a hydrocarbon group having 1 to 30 carbon atoms and optionally having a substituent group, or a halogenated hydrocarbon group having 1 to 30 carbon atoms and optionally having a substituent group.

M represents at least one kind of metal atom selected from the group consisting of Si, Ge, Sn, Ti, and Zr.

X represents a hydroxyl group or a hydrolysable group.

n represents any integer of 1 to (m−1), m represents an atomic valence of M, in a case where n is 2 or more, $R^1$ is the same or different in each case, and in a case where (m−n) is 2 or more, X is the same or different in each case.

Definition of the substituent group in Formula (I) is as follows.

Examples of "hydrocarbon group having 1 to 30 carbon atoms" in $R^1$ include alkyl groups such as a methyl group, an ethyl group, an n-propyl group, an isopropyl group, an n-butyl group, an isobutyl group, a sec-butyl group, a t-butyl group, an n-pentyl group, an isopentyl group, a neo-pentyl group, a t-pentyl group, an n-hexyl group, an isohexyl group, an n-heptyl group, an n-octyl group, an n-decyl group, and an n-octadecyl group; cycloalkyl groups such as a cyclopropyl group, a cyclopentyl group, and a cyclohexyl group; alkenyl groups such as a vinyl group, a propenyl group, a butenyl group, a pentenyl group, an n-decenyl group, and an n-octadecenyl group; cycloalkenyl groups such as 1-cyclobutenyl group, 2-cyclopentenyl group, and 3-cyclohexenyl group; alkynyl groups such as a ethynyl group, a propynyl group, a butynyl group, a pentynyl group, an n-decynyl group, and an n-octadecynyl group; aryl groups such as a phenyl group, 1-napthl group, and 2-naphthyl group; arylalkyl groups such as a benzyl group, a phenethyl group, a 1-naphthylmethyl group, a 2-naphthylmethyl group; and the like.

"Halogenated hydrocarbon groups having 1 to 30 carbon atoms" represents that a hydrogen atom, of the hydrocarbon group having 1 to 30 carbon atoms is substituted with a halogen atom. Among these, a group, in which two or more hydrogen atoms in an alkyl group having 1 to 30 carbon atoms are substituted with two or more halogen atoms, is preferable.

Here, the halogen atom represents F, Cl, Br, or I.

Examples of the "substituent group" in the sentence "optionally having a substituent group" include carboxyl groups; hydroxyl groups; amino groups; alkyl-substituted amino groups such as a methylamino group, an ethylamino group, and a dimethylamino group; alkylaminocarbonyl groups such as a methylaminocarbonyl group, a dimethylaminocarbonyl group, and an ethylaminocarbonyl group; alkoxy groups such as a methoxy group and an ethoxy group; aryloxy groups such as a phenoxy group and a naphthoxy group; alkylcarbonyl groups such as a methylcarbonyl group and a ethylcarbonyl group; alkylcarbonyloxy groups such as a methyl carbonyloxy group and an ethylcarbonyloxy group; arylcarbonyl groups such as a benzoyl group and a naphthoyl group; arylcarbonyloxy groups such as a phenylcarbonyloxy group and a naphthylcarbonyloxy group; alkoxycarbonyl groups such as a methoxycarbonyl group and an ethoxycarbonyl group; aryloxycarbonyl groups such as a phenoxycarbonyl group and a naphthoxycarbonyl group; alkylthio groups such as a methylthio group and an ethylthio group; alkylsulfinyl group such as a methylsulfinyl group and an ethylsulfinyl group; alkylsulfonyl groups such as amethylsulfonyl group and an ethylsulfonyl group; arylthio groups such as a phenylthio group and a napthylthio group; arylsulfinyl groups such as phenylsulfinyl group and a naphthylsulfinyl group; arylsulfonyl groups such as a phenylsulfonyl group and a naphthylsulfonyl group; heterocycle groups such as a pyrrol-2-yl group, an imidazol-2-yl group, and a pyrimidin-2-yl group; silyl groups such as a trimethylsilyl group and a triethylsilyl group. It is preferable that the number of the substituent groups be 0 to 3.

Specific preferred examples of $R^1$ include the following groups, but there is no limitation thereto.

Hydrocarbon Group $CH_3(CH_2)_9$—, $CH_3(CH_2)_{10}$—, $CH_3(CH_2)_{11}$—, $CH_3(CH_2)_{12}$—, $CH_3(CH_2)_{13}$—, $CH_3(CH_2)_{14}$—, $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—, $CH_3(CH_2)_{21}$—, $CH_3(CH_2)_{22}$—, $CH_3(CH_2)_{23}$—, $CH_3(CH_2)_{23}$—, $CH_3(CH_2)_{25}$—, and the like Halogenated Hydrocarbon Group $CF_3(CH_2)_2$—, $CF_3(CF_2)_3(CH_2)_2$—, $CF_3(CF_2)_5(CH_2)_2$—, $CF_3(CF_2)_7CH_2)_2$—, $CF_3(CF_2)_7(CH_2)_2$—, and the like.

M represents one kind of atom selected from the group consisting of Si, Ge, Sn, Ti, and Zr. Among these, a silicon atom is particularly preferable from the viewpoints of ease of availability of a raw material, reactivity, and the like.

There is no particular limitation for the "hydrolysable group" in X as long as the group reacts with water and is decomposed. Examples thereof include alkoxy groups having 1 to 6 carbon atoms and optionally having a substituent group; acyloxy groups optionally having a substituent group; halogen atoms such as F, Cl, Br, and I; isocyanate groups; cyano groups; amino groups; amide groups; and the like.

Examples of the alkoxy group having 1 to 6 carbon atoms include methoxy groups, ethoxy groups, n-propoxy groups, isopropoxy groups, n-butoxy groups, see-butoxy groups, t-butoxy group, n-pentyloxy group, n-hexyloxy groups, and the like.

Examples of the acyloxy group include alkylcarbonyloxy groups having 1 to 6 carbon atoms such as an acetoxy group, a propionyloxy group, an n-propyl carbonyloxy group, an isopropylcarbonyloxy group, and an n-butylcarbonyloxy group; arylcarbonyloxy groups such as a phenylcarbonyloxy group and a naphthylcarbonyloxy group; arylalkylcarbonyloxy groups such as a benzylcarbonyloxy group and a phenethylcarbonyloxy group; and the like.

Examples of a substituent group in the sentence "optionally having a substituent group" include a halogen atom, an alkoxy group, an aryloxy group, an aryl group, an alkylthio group, and an arylthio group.

As X, a hydroxy group, an alkoxy group having 1 to 4 carbon atoms, an acyloxy group, a halogen atom, or an isocyanate group is preferable, and an alkoxy group or acyloxy group having 1 to 4 carbon atoms is more preferable.

Commonly, n represents any integer of 1 to 3. n is preferably 1 from the viewpoint of producing a high-density organic thin film.

When n is 2 or more, $R^1$ may be the same or different in each case, and in a case where (m−n) is 2 or more, X may be the same or different in each case.

Specific examples of the organic metal compound expressed by Formula (I) include the following compounds. In the following description, compounds, in which $R^1$ is a hydrocarbon group and M is Si, are exemplified as a representative example, but the invention is not limited thereto.

$CH_3(CH_2)_9Si(OCH_3)_3$, $CH_3(CH_2)_{11}Si(OCH_3)_3$, $CH_3(CH_2)_{13}Si(OCH_3)_3$, $CH_3(CH_2)_{15}Si(OCH_3)_3$, $CH_3(CH_2)_{17}Si(OCH_3)_3$, $CH_3(CH_2)_{19}Si(OCH_3)_3$, $CH_3(CH_2)_{21}Si(OCH_3)_3$, $CH_3(CH_2)_{17}Si(OCH_2CH_3)_3$, $CH_3(CH_2)_{17}SiCl_3$, $CH_3(CH_2)_9Si(OCH_2CH_3)_3$, $CH_3(CH_2)_9SiCl_3$, $CH_3(CH_2)_9Si(CH_3)(OCH_2CH_3)_2$, $CH_3(CH_2)_9Si(CH_3)(OCH_3)_2$, $CH_3(CH_2)_{17}Si(OCH_3)_2(OH)$, $CH_3(CH_2)_{17}Si(OCH_3)(OH)_2$, $CH_3(CH_2)_{17}Si(OH)_3$, $CH_3(CH_2)_{17}Si(OCOCH_3)_3$, $CH_3(CH_2)_{17}SiCl_3$, $CH_3(CH_2)_{17}Si(CN)_3$, $CH_3(CH_2)_{17}Si(NH_2)_3$, $CH_3(CH_2)_{17}Si(NHCOCH_3)_3$, $CH_3(CH_2)_9Si(NCO)_3$, $CH_3(CH_2)_{10}Si(NCO)_3$, $CH_3(CH_2)_{11}Si(NCO)_3$, and the like.

In addition, these compounds may be used alone or in combination of two or more kinds.

(2) Method for Producing Solid Material or Oily Material for Forming Organic Thin Film The solid material and the oily material for forming an organic thin film, which is used in the invention, are produced according to any one of the following two methods.

(2-1) Production in Lower Alcohol-Based Solvent

This is a method for carrying out a hydrolysis and condensation reaction of the compound expressed by Formula (I) in a lower alcohol-based solvent in the presence of water and an acid catalyst.

The lower alcohol in the invention represents alcohol having an alkyl group having 1 to 4 carbon atoms, and examples thereof include methanol, ethanol, n-propanol, isopropanol, n-butanol, isobutanol, tert-butanol, ethyleneglycol, propyleneglycol, and the like. These may be used alone or in combination of two more kinds. A used amount is not particularly limited, and 1% to 99% by mass on the basis of the total amount of a reaction solution is used.

In the present method, in addition to the lower alcohol-based solvent, solvents such as an aliphatic solvent, an aromatic solvent, ether, ketone, and chlorine-based solvent may be contained.

With regard to a used amount of water, water with a concentration of 0.5% to 5% by mass in the reaction solution is used, more preferably 1% to 4% by mass, and still more preferably 1% to 2% by mass. When a moisture content in the reaction solution is high, the hydrolysis and condensation reaction of the organic metal compound expressed by Formula (I) progresses excessively, and thus solubility of a product greatly decreases. On the other hand, when the used amount of water is too small, progress of the hydrolysis and condensation reaction becomes slow. It is preferable that the hydrolysis product of the invention have a hydroxy group generated by hydrolysis, and a hydrolysable group be appropriately present.

Examples of the acid catalyst include a mineral acid such as hydrochloric acid, sulfuric acid, nitric acid, hydroiodic acid, and hydrobromic acid, an organic acid such as trifluoroacetic acid, p-toluenesulfonic acid, and methane sulfonic acid. Preferably, acids of $pKa \leq 0$ may be exemplified.

A used amount of the mineral acid and the organic acid is not particularly limited as long as physical properties of an organic metal thin film to be formed are not affected, but 0.01 millimoles to 1 mole with respect to 1 mole of organic metal compound is used. On the other hand, a used amount of a solid acid is not particularly limited as long as physical properties of an organic thin film to. be formed are not affected, but 0.05% to 20% by mass with respect to the organic metal compound is used.

A reaction temperature is different depending on a solvent, and is 0° C. to a boiling point of a solvent (for example, 65° C. in the case of methanol). A reaction time is different depending on a purpose, and is one minute to 100 days. It is preferable that the reaction be carried out until at least a solid content precipitates or an oily material is separated. Specifically, the reaction is preferably carried out for at least 48 hours or more. When the reaction time is short, a residual amount of an unreacted organic metal becomes large, and thus an amount of a dimer is larger than that of airliner or more. When the reaction time becomes long, the unreacted organic metal compound disappears, and thus a condensation product of a trimer or more becomes a main component.

In the condensation product that is obtained, a degree of condensation increases with the passage of the reaction time. That is, at an initial period of the reaction, an unreacted organic metal compound remains, and the amount of the dimer is larger than that of the trimer. Then, the unreacted organic metal compound approximately disappears with the passage of time, and the dimer decreases, and a condensation product of the trimer or more increases. In the invention, the condensation product of the trimer or more often has an annular shape.

In the method, accompanying the condensation, the solid material or oily material is generated and settles. The solid material or oily material may be separated by a method such as filtration and liquid separation.

(2-2) Production in Aliphatic Ether-Based Solvent or Aliphatic Ketone-Based Solvent This is a method for carrying out the hydrolysis and condensation reaction, of the compound expressed by Formula (1) in an aliphatic ether-based solvent or an aliphatic ketone-based solvent in the presence of water and an acid catalyst.

The solvent that is used during the hydrolysis and condensation is not particularly limited as long as the condensation product of the invention may be produced. However, particularly, aliphatic ether such as tetrahydrofuran (THF), tetrahydropyran (THP), cyclopentyl methyl ether, and 1,2-diethoxyethane; or aliphatic ketone such as acetone, methyl ethyl ketone, and methyl isobutyl ketone are preferable. Among these, alicyclic ether is preferable, and tetrahydrofuran (THF) and tetrahydropyran (THP) are particularly preferable. A used amount is not particularly limited, but commonly, 1% to 99% by mass on the basis of the total amount of a reaction solution is used.

With regard to a used amount of water, 0.1 to 20 moles with respect to 1 mole of the organic metal compound expressed by Formula (II) is used, more preferably 0.5 to 6 moles, and still more preferably 1 to 4 moles.

The acid catalyst, the reaction temperature, and the reaction time may be selected as described above.

In this method, a solution of a condensation product that is obtained by the hydrolysis or a dispersed solution in which the condensation product settles is subjected to an operation such as concentration, concentration and drying, filtration, liquid separation, and extraction, or a combined operation of these, whereby a reaction product of a solid material or an oily material is obtained.

(2-3) Neutralization Process

In the methods (2-1) and (2-2), a process of neutralizing the acid that is used is preferably provided between the hydrolysis and condensation: process, and the process of separating the solid content precipitated from the reaction solution of the above-described process or the oily material separated from the reaction solution, or concentrating and drying the reaction solution of the above-described process to obtain a solid material or an oily material for forming a stable organic thin film. Specifically, the neutralization is carried out by adding alkali metal hydroxide or alkali earth metal hydroxide such as sodium hydroxide, potassium hydroxide, and magnesium hydroxide, or an organic amine compound such as pyridine and diethyl amine, or the like to reaction solution slurry, and by stirring the resultant mixture.

(3) Condensation Reaction Product

A condensation reaction product that is obtained by the method (2) is a hydrolysis product or a partial hydrolysis product of the compound expressed by (I), and/or a condensation product thereof or a partial hydrolysis product thereof.

Here, presence of an organic metal compound having a different degree of polymerization and a ratio thereof may be obtained from, for example, a peak position and an abundance ratio of an area in GPC (Gel Permeation Chromatography). In addition, presence of an organic metal compound having a different number of OH groups and a ratio thereof may be obtained from, for example, a peak position and an abundance ratio HPLC (High Performance Liquid Chromatography).

In addition, a degree of hydrolysis may be obtained from a degree of condensation by GPC and a remaining ratio of a hydrolysable group by NMR.

(4) Organic Thin Film-Forming Solution Containing Organic Metal Compound

An organic thin film-forming solution is a solution prepared to be brought into contact with a base material and represents a solution in which an organic thin film-forming material such as an organic metal compound is contained in a solvent.

The condensation product in the invention is produced from the organic metal compound expressed by Formula (I), and thus an unreacted organic metal compound expressed by Formula (I) may be present in a solvent. However, it is preferable to reduce the organic metal compound expressed by Formula (I) as much as possible so as to produce a suitable organic thin film.

(5) Preparation of Organic Thin Film-forming Solution

The organic thin film-forming solution of the invention is prepared by stirring and mixing the solid material or oily material of the condensation product produced according to the method described in (2) with an organic solvent.

Finally, the total amount of the organic metal compound contained in the organic thin film-forming solution is 0.01% to 20% by mass, and preferably 0.1% to 5% by mass.

Examples of the organic solvent that is used to prepare the organic thin film-forming solution include a hydrocarbon-based solvent, a carbon fluoride-based solvent, and a silicone-based solvent, and the hydrocarbon-based solvent is preferable. A hydrocarbon-based solvent having the boiling point of 100° C. to 250° C. is particularly preferable.

Specific examples thereof include, hydrocarbon-based solvents such as n-hexane, cyclohexane, benzene, toluene, xylene, SOLVESSO (registered trademark) 150 (product manufactured by Exxon Mobil Corporation), petroleum naphtha, solvent naphtha, petroleum ether, petroleum benzene, isoparaffin, normal paraffin, decaline, industrial gasoline, kerosene, and ligroin; Freon-based solvents such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, and $Cl(CF_2CFCl)_3Cl$; a carbon fluoride-based solvent such as Fluorinert (registered trademark, manufactured by 3M Corporation) and aflud (product manufactured by ASAHI GLASS CO., LTD); fluorine-based solvents such as Novec HFE-7200, Novec HFE-7300, and Novec HFE-7600 (registered trademark, products manufactured by 3M Corporation); silicone-based solvents such as dimethyl silicone, phenyl silicone, alkyl-modified silicone, and polyether silicone. These solvents may be used alone or in combination of two or more kinds.

A stirring temperature of a mixture is commonly −100° C. to +100° C., and preferably −20° C. to +50° C. A stirring time is commonly several minutes to several hours.

In addition, in this case, an ultrasonic treatment is preferably performed so as to obtain a uniform organic thin film-forming solution.

A precipitate containing a metal oxide or the like may form in the organic thin film-forming solution that is prepared, but it is preferable to remove these impurities such as the precipitate so as to obtain a dense monomolecular organic thin film having no impurity. The precipitate may be conveniently removed by an operation such as filtration and decantation.

The organic thin film-forming solution of the invention is excellent in preservation stability, and may form a satisfactory organic thin film even alter hermetic preservation for 40 to 60 days at room temperature (20° C. to 30° C.).

(6) Preparation of Organic Thin Film

The organic thin film of the invention may be prepared on the substrate surface by bringing the organic thin film-forming solution that is obtained described above into contact with the substrate.

As a substrate that is used, a substrate having active hydrogen on a surface thereof is preferable. Specific example of the substrate include substrates formed from metals such as aluminum, copper, nickel, and stainless steel; silicon; ceramics; glass; plastic; paper; natural fibers or synthetic fibers; leather; and other hydrophilic materials; and the like.

In a case of a substrate formed from a material not having a hydroxyl group on a surface, a hydrophilic group may be introduced to the substrate by treating the surface of the substrate in a plasma atmosphere containing oxygen or corona-treating the surface of the substrate in advance. As the hydrophilic group, a hydroxyl group (—OH) is preferable, but may be a functional group having active hydrogen such as —COOH, —CHO, =NH, and —NH$_2$.

In addition, in a case of a substrate not having active hydrogen on a surface thereof, a silica underlying layer having active hydrogen on a surface may be formed by bringing Si(OR)4 or a hydrolysis and condensation product thereof into contact with the surface of the substrate in advance, and then subjecting the surface to a dealcoholization reaction as necessary, or by bringing $SiCl_4$, $SiHCl_3$, $SiH_2Cl_2$, or Cl—$(SiCl_2O)c$-$SiCl_3$ (in the formula, c represents 0 or a natural number) into contact with the surface of the substrate, and then subjecting the surface a dehydrochlorination reaction.

A method of bringing the organic thin film-forming solution of the invention into contact with the substrate surface is not particularly limited, and a method in the related art may be used. Specific examples of the method include a dipping method, a spin coating method, a spraying method, a roller coating method, a Mayer Bar method, a screen printing method, a brushing method, and the like, and among these, the dipping method is preferable.

A temperature at which the organic thin film-forming solution of the invention is brought into contact with the substrate surface is not particularly limited as long as the temperature is within a temperature range capable of maintaining stability of the solution of the invention. Commonly, the contacting may be carried out in a range of room temperature to a reflux temperature of a solvent that is used for preparation of the solution. To obtain a temperature that is suitable for the contacting, the organic thin film-forming solution of the invention may be heated or the substrate itself may be heated.

In addition, an ultrasonic wave may be used to promote the film formation. A process of bringing the solution into contact with the substrate surface may be carried out one time for a long time, or may be carried out several times of a short-time coating.

After the organic thin film-forming solution of the invention is brought into contact with the substrate surface, a washing process of removing a surplus reagent, impurities, and the like that are attached to the film surface may be provided. When the washing process is provided, the film thickness may be further controlled. A washing method is not particularly limited as long as the method is capable of removing attached matter on the surface. Specific examples thereof include a method of immersing the substrate in a solvent capable of dissolving the organic metal compound that is used; a method of leaving the substrate as is in the air in vacuum or at normal pressure and evaporating the attached matters; a method of spraying an inert gas such as a dry nitrogen gas and blowing out the attached matters; and the like.

After bringing the organic thin film-forming solution of the invention into contact with the substrate or after the washing, it is preferable to heat the substrate so as to stabilize a film formed on the substrate surface. A heating temperature may be appropriately selected according to the substrate, stability of the organic thin film that is formed, and the like.

(7) Organic Thin film

When the organic thin film-forming solution of the invention is brought into contact with the substrate, an organic metal compound in the organic thin film-forming solution is absorbed on the substrate surface, whereby a thin film is formed. As one mechanism in which the organic metal compound is absorbed on the substrate surface, in a case of the substrate having active hydrogen on the surface thereof, a mechanism in which an OH group in the organic metal compound reacts with the active hydrogen on the substrate surface and a strong chemical bond with the substrate is formed may be considered.

Particularly, the method of the invention may be appropriately used to manufacture a monomolecular film. In addition, a method of forming a film on a surface by physical absorption may be used.

The organic thin film that is formed by the invention is not particularly limited, but a crystalline organic thin film is preferable. A fact that the organic thin film that is formed by the invention has crystallinity may be confirmed by measuring the organic thin film using a thin film X-ray diffraction apparatus.

In the case of a monomolecular film, the film thickness of the organic thin film that is formed by the invention is substantially the same as a chain length of R in Formula (I).

The organic thin film that is formed by the invention may be a chemical absorption film, and the substrate may not have crystallinity and the chemical absorption film may have crystallinity. In this case, the crystallinity may be a polycrystal or single crystal. Examples of the chemical absorption film include an organic thin film that is covalently bonded through a metal-oxygen bond.

The organic thin film that is formed by the invention is preferably a self-assembled film or a self-organized film. Here, the self-assembled film represents a film that is obtained by forming a structure with order without a coercive force from the outside.

As described above, when using the organic thin film-forming solution of the invention, it is possible to form a dense organic thin film having less impurities regardless of a kind of substrate at a high speed compared to the related art. This organic thin film may be very easily applied for forming a design pattern for an electric device or the like, and apparatuses in which a heat-resistant, water-resistant, and corrosion-resistant ultrathin film coating is necessary such as electronic products, particularly, electric appliances, vehicles, industrial apparatuses, mirrors, and spectacle lenses. In addition to these, the organic thin film is useful as a releasing agent for a mold.

Hereinafter, the invention will be described in more detail using Examples, but the invention is not limited to these Examples.

Example 1

Methanol (58.35 g) was added to octadecyl trimethoxy silane (hereinafter, referred to as "ODS"; purity was 98% by mass or more: 1.91 g) and the resultant reaction solution was stirred. Then, 0.1N hydrochloric acid (0.85 g) was added to the resultant reaction solution (moisture content in the reaction solution was approximately 1.4% by mass), and the resultant reaction solution was stirred for three days at room temperature. A solid that was obtained by suctioning and filtering the resultant reaction solution slurry was dried under reduced pressure (30° C., <10 torr), whereby 1.28 g of white powder was obtained.

The white powder (0.184 g) was dissolved in SOLVESSO (registered trademark) 150 (29.82 g) by an ultrasonic treatment, and then the resultant material was left as is at room temperature overnight, and then was filtered by a PTFE cartridge filter (Millex, manufactured by Millipore Corporation), whereby a self-assembled monolayer (SAM)-forming solution was obtained.

A Si single crystal wafer that was subjected to an UV ozone treatment was immersed in the SAM-forming solution for three minutes, and then was washed with NS clean 100, and then, was dried at 60° C., whereby a SAM-formed substrate was obtained. A static contact angle on a film-forming surface was measured. From the measurement, the static contact angle was 109° with water and 41° with tetradecane.

Comparative Example 1

Methanol (25.94 g) was added to ODS (purity was 98% by mass or more; 1.91 g) and the resultant reaction solution was stirred. Then, water (2.60 g) and 0.05N hydrochloric acid (0.10 g) were added to the resultant reaction solution (moisture content in the reaction solution was approximately 8.5% by mass), and the resultant reaction solution was stirred for four hours at room temperature. A solid that was obtained by suctioning and filtering the resultant reaction solution slurry was dried under reduced pressure (30° C., <10 torr), whereby white powder (ODS hydrolysis mixture, 1.47 g) was obtained.

The white powder (0.184 g) was intended to be dissolved in SOLVESSO (registered trademark) 150 (29.82 g) by an ultrasonic treatment, but was not dissolved completely. This dispersion was left as is at room temperature overnight, and then was filtered by a PTFE cartridge filter (Millex, manufactured by Millipore Corporation), whereby a SAM-forming solution was obtained.

Si single crystal wafer that was subjected to an UV ozone treatment was immersed in the SAM-forming solution for three minutes, and then was washed with NS clean 100, and then was dried at 60° C., whereby a SAM-formed substrate was obtained. The static contact angle on the film-forming surface was measured. From the measurement, it could be seen that film formation activity was low (63° with water and 20° with tetradecane)

Example 2

Methanol (25.35 g) was added to ODS (purity was 98% by mass or more; 4.78 g) and the resultant reaction solution was stirred. Then, 0.1N hydrochloric acid (0.43 g) was added to the resultant reaction solution (moisture content in the reaction solution was approximately 1.4% by mass), and the resultant reaction solution was stirred for three days at room temperature. A solid that was obtained by suctioning and filtering the resultant reaction solution slurry was dried under reduced pressure (90° C., −10 torr), whereby 3.97 g of white powder was obtained.

Similarly to Example 1, a SAM-forming solution was prepared, and a SAM-formed substrate was prepared. The static contact angle on the film-forming surface was 109° with water and 44° with tetradecane. From results of grazing incidence X-ray diffraction measurement (GIXD), it could be seen that ODS molecules had a regular molecular arrangement.

In addition, from results of X-ray reflectance measurement (XRR), the film thickness was 2.4 nm.

Example 3

Methanol (441.46 g) was added to ODS (purity was 98% by mass or more; 150.14 g) and the resultant reaction solution was stirred. Then, 0.2N hydrochloric acid (8.39 g) was added to the resultant reaction solution (moisture content in the reaction solution was approximately 1.4% by mass), and the resultant reaction solution was stirred tor two days at room temperature. A solid that was obtained by subjecting the resultant reaction solution slurry to centrifugal filtration was dried under reduced pressure (30° C., 10 torr), whereby 131.72 g of white powder was obtained.

The white powder (0.307 g) was dissolved in SOLVESSO (registered trademark) 150 (49.69 g) by an ultrasonic treatment, and then the resultant material was left as is at room temperature for overnight, and then was filtered by a FIFE cartridge filter (Millex, manufactured by Millipore Corporation), whereby a SAM-forming solution was obtained.

Similarly to Example 1, a SAM-formed substrate was prepared. The static contact angle on the film-forming surface was 110° with water and 4220 with tetradecane.

Example 4

Acetonitrile/methanol (1:1) (25.35 g) was added to ODS (purity was 98% by mass or more; 4.78 g) and the resultant reaction solution was stirred. Then, 0.1N hydrochloric acid (0.43 g) was added to the resultant reaction solution (moisture content in the reaction solution was approximately 1.4% by mass), and the resultant reaction solution was stirred for three days at room temperature. A solid that was obtained by suctioning and filtering the resultant reaction solution slurry was dried under reduced pressure (30° C., <10 torr), whereby 3.87 g of white powder was obtained.

Similarly to Example 1, a SAM-forming solution was prepared, and a SAM-formed substrate was prepared. The static contact angle on the film-forming surface was 110° with water and 43° with tetradecane.

Example 5

Acetonitrile/tetrahydrofuran (1:1) (25.35 g) was added to ODS (purity was 98% by mass or more; 4.78 g) and the resultant reaction solution was stirred. Then, 0.1N hydrochloric acid (0.43 g) was added to the resultant reaction solution (moisture content in the reaction solution was 1.9 moles with respect to 1 mole of ODS), and the resultant reaction solution: was stirred for three days at room temperature. A solid that was obtained by suctioning and filtering the resultant reaction solution slurry was dried under reduced pressure (30° C., <10 torr). whereby 3.85 g of white powder was obtained.

Similarly to Example 1, a SAM-forming solution was prepared, and a SAM-formed substrate was prepared. The static contact angle on the film-forming surface was 108° with water and 43° with tetradecane.

Example 6

Tetrahydrofuran (25.35 g) was added to ODS (purity was 98% by mass or more; 4.78 g) and the resultant reaction solution was stirred. Then, 0.1N hydrochloric acid (0.43 g) was added to the resultant reaction solution (moisture content in the reaction solution was 1.9 moles with respect to 1 mole of ODS), and the resultant reaction solution was stirred for three days at room temperature. A solid that was obtained by concentrating and drying the reaction solution using an evaporator was dried under reduced pressure (30° C., <10 torr), whereby 3.25 g of white powder was obtained.

Similarly to Example 1, a SAM-forming solution was prepared, and a SAM-formed substrate was prepared. The static contact angle on the film-forming surface was 110° with water and 41° with tetradecane.

Example 7

Methanol (29.17 g) was added to tetradecyl trimethoxy silane (TDS; purity was 95% by mass or more; 0.81 g) and the resultant reaction solution was stirred. Then, 0.1N hydrochloric acid (0.43 g) was added to the resultant reaction solution (moisture content in the reaction solution was approximately 1.4% by mass), and the resultant reaction solution was stirred for three days at room temperature. A solid that was obtained by suctioning and filtering the resultant reaction solution slurry was dried under reduced pressure (30° C., <10 torr), whereby 0.13 g of white powder was obtained.

Similarly to Example 1, a SAM-forming solution was prepared, and a SAM-formed substrate was prepared. The static contact angle on the film-forming surface was 107° with water and 42° with tetradecane.

As described above, in Examples 1 to 7 in which the moisture content in the reaction solution was set to 0.5% to 5% by mass, dissolubility of a product was satisfactory and film formation activity was high compared to Comparative Example 1 in which the moisture content was set to be as high as approximately 8.5% by mass.

Stability Test 10 g of the solid that was obtained in Example 3 was put into a polyethylene bottle and this bottle was covered with a lid. Then, the solid was kept at room temperature for 5 days, 3 months, 6 months, and 12 months, respectively, and then similarly to Example 1, a SAM solution was prepared using the solid that was kept, and a SAM film-forming substrate was prepared. Then, the static contact angle on the film-forming surface was measured. Results thereof are shown in Table 1.

TABLE 1

| Solid keeping period | Static contact angle | |
|---|---|---|
| | Water | Tetradecane |
| 5 days | 110° | 42° |
| 3 months | 110° | 41° |
| 6 months | 109° | 42° |
| 12 months | 110° | 41° |

From the results of the stability test, it could be seen that even when being kept for 12 months, the static contact angle, that is, film formation activity of the solid of Example 3 did not decrease, and stability thereof was excellent.

Example 8

Methanol (73.6 g) was added to ODS (purity was 98% by mass or more: 25.0 g) and the resultant reaction solution was stirred. Then, 0.2N hydrochloric acid (1.88 g) was added to the resultant reaction solution (moisture content in the reaction solution was approximately 1.9% by mass), and the resultant reaction solution was stirred for two days at room temperature. The resultant reaction solution slurry was suctioned and filtered and then was washed three times with methanol (8 ml).

A solid that was obtained was dried under reduced pressure (90° C., <10 torr), whereby a white powder A (21.2 g) was obtained.

The white solid (0.48 g) was dissolved in SOLVESSO (registered trademark) 150 (79.52 g) by an ultrasonic treatment, whereby a SAM-forming solution was obtained.

Si single crystal wafer that was subjected to an UV ozone treatment was immersed in the SAM-forming solution for three minutes, and then was washed with NS clean 100, and then was dried at 60° C., whereby a SAM-formed substrate was obtained. The static contact angle on the film-forming surface was measured. From the measurement, the static contact angle was 108° with water and 41° with tetradecane.

Example 9

Methanol (73.6 g) was added to ODS (purity was 98% by mass or more: 25.0 g) and the resultant reaction solution was stirred. Then, 0.2N hydrochloric acid (1.88 g) was added to the resultant reaction solution (moisture content in the reaction solution was approximately 1.9% by mass), and the resultant reaction solution was stirred for two days at room temperature. 0.2N aqueous caustic soda solution (1.7 g) was added to the resultant reaction solution slurry. Then, the resultant mixture was stirred for one hour, and was subjected to suction filtration, and then washed three times with methanol (8 ml).

A solid that was obtained was dried under reduced pressure (90° C., <10 torr), whereby a white powder B (20.8 g) was obtained.

The white solid (0.48 g) was dissolved in SOLVESSO (registered trademark) 150 (79.52 g) by an ultrasonic treatment, whereby a SAM-forming solution was obtained.

Si single crystal wafer that was subjected to an UV ozone treatment was immersed in the SAM-forming solution for three minutes, and then was washed with NS clean 100, and then was dried at 60° C., whereby a SAM-formed substrate was obtained. The static contact angle on the film-forming surface was measured. From the measurement, the static contact angle was 110° with water and 40° with tetradecane.

Stability Test

The white solid that was obtained in Examples 8 and 9 was kept at room temperature, and the stability was confirmed by GPC analysis. Results thereof are shown in Table 2.

GPC Conditions
Column: KF-802/Shodex (separation range: 150 to 5,000)
Moving phase: THF
Flow rate: 1 ml/min
Column temperature: 40° C.

From results of the stability test, it could be seen that with regard to a degree of condensation after two weeks, an increase thereof was suppressed in condensation products of a dimer to a trimer or more in Example 9 compared to Example 8. From this, it could be seen that the white solid of Example 9 that was subject to the neutralization before the filtration was more excellent in stability compared to the white solid of Example 8 that was not subjected to the neutralization.

INDUSTRIAL APPLICABILITY

When a solid material for forming an organic thin film and the like and a solvent that dissolves the solid material are prepared by using the method of the invention, an organic thin film such as a highly functional monomolecular film may be formed anywhere, and thus it can be said that industrial utility value is high.

The invention claimed is:

1. A method for producing a solid material or an oily material for forming an organic thin film, the method comprising:

process (A): a process of hydrolyzing and condensing at least one kind of organic metal compound expressed by Formula (I) in a lower alcohol-based solvent in the presence of water and an acid with a concentration of 0.5% to 5% by mass in the resultant reaction solution to obtain the solid material or oily material, $$R^1{}_n MX_{m-n} \qquad (I),$$

wherein in the formula,

R$^1$ represents one selected from the group consisting of CH$_3$(CH$_2$)$_9$—, CH$_3$(CH$_2$)$_{10}$—, CH$_3$(CH$_2$)$_{11}$—, CH$_3$(CH$_2$)$_{12}$—, CH$_3$(CH$_2$)$_{13}$—, CH$_3$(CH$_2$)$_{14}$—, CH$_3$(CH$_2$)$_{15}$—, CH$_3$(CH$_2$)$_{16}$—, CH$_3$(CH$_2$)$_{17}$—, CH$_3$(CH$_2$)$_{18}$—, CH$_3$(CH$_2$)$_{19}$—, CH$_3$(CH$_2$)$_{20}$—, CH$_3$(CH$_2$)$_{21}$—, CH$_3$(CH$_2$)$_{22}$—, CH$_3$(CH$_2$)$_{23}$—, CH$_3$(CH$_2$)$_{24}$—, or CH$_3$(CH$_2$)$_{25}$—, M represents at least one kind of metal atom selected from the group consisting of Si, Ge, Sn, Ti, and Zr, X represents a hydroxyl group or a hydrolysable group, n represents any integer of 1 to (m−1), m represents an atomic valence of M, in a case where n is 2 or more, R$^1$ is the same or different in each case, and in a case where (m−n) is 2 or more, X is the same or different in each case;

process (B): a process of separating a solid content precipitated from the reaction solution of the process (A) or an

TABLE 2

GPC analysis results of white solid

| | | Component composition | | | | |
|---|---|---|---|---|---|---|
| | | Mono-compound | Bis-compound | Tris-compound | Tetrakis-compound | Tetrakis-compound or more |
| Example 8 | After drying | 4.1% | 77.2% | 15.5% | 3.2% | 0% |
| | After two weeks | 0.7% | 47.1% | 18.5% | 13.8% | 19.9% |
| Example 9 | After drying | 4.6% | 81.8% | 13.6% | 0% | 0% |
| | After two weeks | 3.4% | 78.6% | 13.6% | 4.3% | 0% | oily material separated from the reaction solution, or concentrating and drying the reaction solution of the process (A) to obtain the solid content or oily material;
wherein the method further comprises a process of neutralizing the acid between the process (A) and the process (B).

2. A solid material or an oily material for forming an organic thin film for forming an organic thin film that is produced by the method for producing a solid material or an oily material for forming an organic thin film according to claim 1.

3. A method for producing a solid material or an oily material for forming an organic thin film, the method comprising:
process (A): a process of hydrolyzing and condensing at least one kind of organic metal compound expressed by Formula (I) in a solvent that contains at least one kind selected from an aliphatic ether-based solvent and an aliphatic ketone-based solvent in the presence of water and an acid of 0.1 to 20 moles with respect to 1 mole of the organic metal compound expressed by Formula (I) to obtain the solid material or oily material, $$R^1_n MX_{m-n} \quad (I),$$

wherein in the formula,
$R^1$ represents one selected from the group consisting of $CH_3(CH_2)_9-$, $CH_3(CH_2)_{10}-$, $CH_3(CH_2)_{11}-$, $CH_3(CH_2)_{12}-$, $CH_3(CH_2)_{13}-$, $CH_3(CH_2)_{14}-$, $CH_3(CH_2)_{15}-$, $CH_3(CH_2)_{16}-$, $CH_3(CH_2)_{17}-$, $CH_3(CH_2)_{18}-$, $CH_3(CH_2)_{19}-$, $CH_3(CH_2)_{20}-$, $CH_3(CH_2)_{21}-$, $CH_3(CH_2)_{22}-$, $CH_3(CH_2)_{23}-$, $CH_3(CH_2)_{24}-$, or $CH_3(CH_2)_{25}-$,
M represents at least one kind of metal atom selected from the group consisting of Si, Ge, Sn, Ti, and Zr,
X represents a hydroxyl group or a hydrolysable group,
n represents any integer of 1 to (m−1),
m represents an atomic valence of M,
in a case where n is 2 or more, $R^1$ is the same or different in each case, and
in a case where (m−n) is 2 or more, X is the same or different in each case;
process (B): a process of separating a solid content precipitated from the reaction solution of the process (A) or an oily material separated from the reaction solution, or concentrating and drying the reaction solution of the process (A) to obtain the solid content or oily material;
wherein the method further comprises a process of neutralizing the acid between the process (A) and the process (B).

4. A solid material or an oily material for forming an organic thin film for forming an organic thin film that is produced by the method for producing a solid material or an oily material for forming an organic thin film according to claim 3.

5. A method for producing an organic thin film-laminated plate, the method comprising:
process (A): a process of hydrolyzing and/or condensing at least one kind of organic metal compound expressed by Formula (I) in a lower alcohol-based solvent or a mixed solvent containing the lower alcohol-based solvent in the presence of water and an acid with a concentration of 0.5% to 5% by mass in the resultant reaction solution, or a process of hydrolyzing and/or condensing the organic metal compound in a solvent that contains at least one kind selected from an aliphatic ether-based solvent and an aliphatic ketone-based solvent and does not contain the lower alcohol solvent in the presence of water and an acid of 0.1 to 20 moles with respect to 1 mole of the organic metal compound expressed by Formula (I), $$R^1_n MX_{m-n} \quad (I),$$

wherein in the formula,
$R^1$ represents one selected from the group consisting of $CH_3(CH_2)_9-$, $CH_3(CH_2)_{10}-$, $CH_3(CH_2)_{11}-$, $CH_3(CH_2)_{12}-$, $CH_3(CH_2)_{13}-$, $CH_3(CH_2)_{14}-$, $CH_3(CH_2)_{15}-$, $CH_3(CH_2)_{16}-$, $CH_3(CH_2)_{17}-$, $CH_3(CH_2)_{18}-$, $CH_3(CH_2)_{19}-$, $CH_3(CH_2)_{20}-$, $CH_3(CH_2)_{21}-$, $CH_3(CH_2)_{22}-$, $CH_3(CH_2)_{23}-$, $CH_3(CH_2)_{24}-$, or $CH_3(CH_2)_{25}-$,
M represents at least one kind of metal atom selected from the group consisting of Si, Ge, Sn, Ti, and Zr,
X represents a hydroxyl group or a hydrolysable group,
n represents any integer of 1 to (m−1),
m represents an atomic valence of M,
in a case where n is 2 or more, $R^1$ is the same or different in each case, and
in a case where (m−n) is 2 or more, X is the same or different in each case;
process (B): a process of separating a solid content precipitated from the reaction solution of the process (A) or an oily material separated from the reaction solution, or concentrating and drying the reaction solution of the process (A) to obtain the solid content or oily material;
process (C): a process of mixing the solid material or oily material obtained in the process (B) with at least one kind of solvent selected from the group consisting of a hydrocarbon-based solvent, a fluorine-based solvent, and a silicon-based solvent, and removing insoluble matter as necessary to obtain an organic thin film-forming solution; and
process (D): a process of bringing a substrate into contact with the organic thin film-forming solution that is obtained in the process (C) to produce a substrate on which an organic thin film is laminated;
wherein the method further comprises a process of neutralizing the acid between the process (A) and the process (B).

6. The method for producing an organic thin film-laminated plate according to claim 5, wherein in the process (A), the hydrolysis or condensation is carried out until at least the solid content precipitates or the oily content is separated.

7. The method for producing an organic thin film-laminated plate according to claim 5, wherein in the process (A), the hydrolysis or condensation is carried out for at least 48 hours.

8. The method for producing an organic thin film-laminated plate according to claim 5, wherein the organic thin film is a monomolecular film.

9. An organic thin film-laminated plate that is produced by the method for producing an organic thin film-laminated plate according to claim 5.

* * * * *